112,707

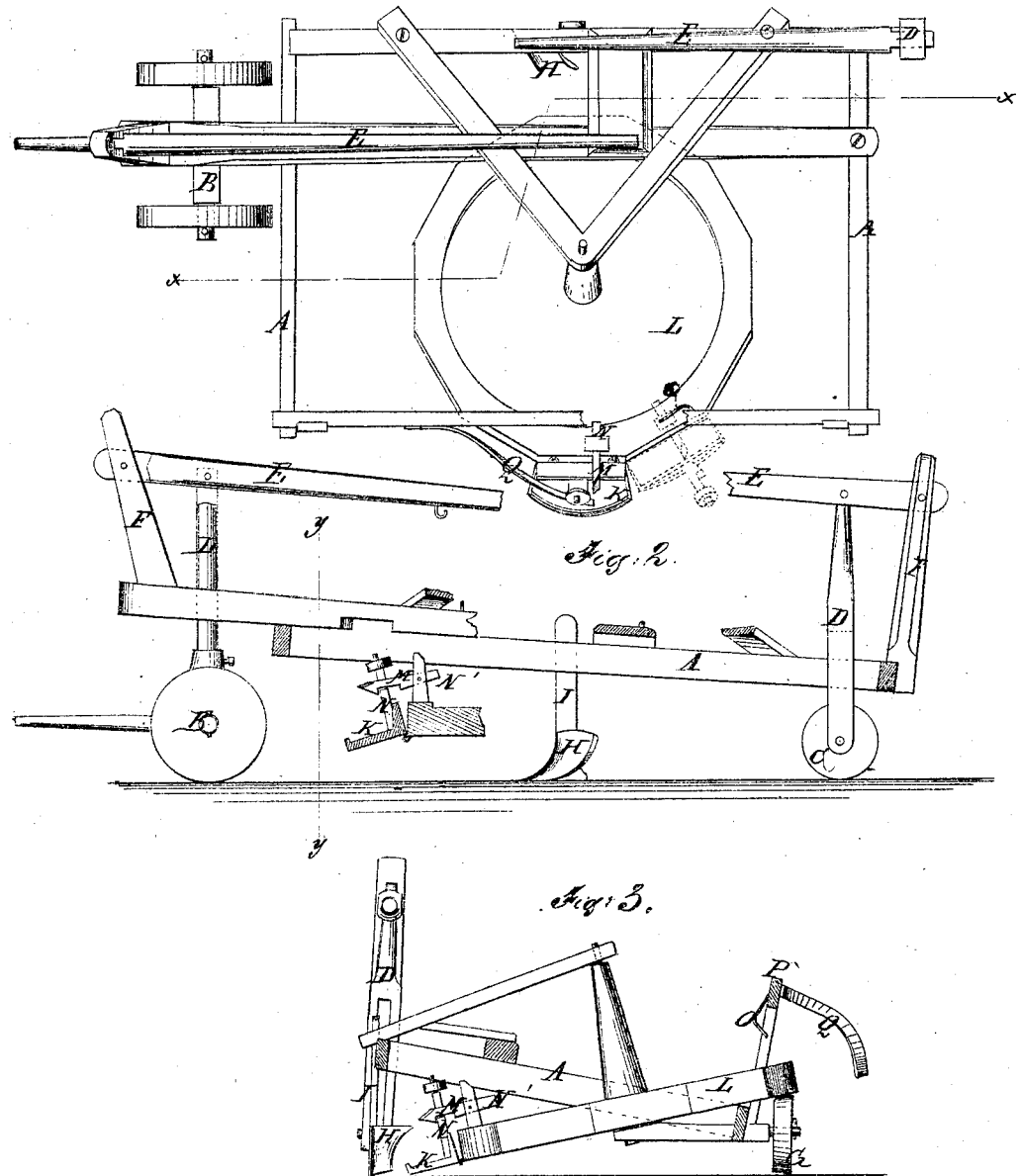

UNITED STATES PATENT OFFICE.

JOSEPH W. FAWKES, OF MAROA, ILLINOIS.

IMPROVEMENT IN GRADING AND DITCHING-MACHINES.

Specification forming part of Letters Patent No. 118,707, dated September 5, 1871.

*To all whom it may concern:*

Be it known that I, JOSEPH W. FAWKES, of Maroa, in the county of Macon and State of Illinois, have invented a new and Improved Grader and Ditcher; and I do hereby declare that the following is a full, clear, and exact description thereof, which will enable others skilled in the art to make and use the same, reference being had to the accompanying drawing forming part of this specification.

This invention relates to improvements in apparatus for grading and ditching, of the class in which a common or any approved plow is mounted on a truck-frame, on which is arranged a table provided with carriers for taking the earth turned up by the plow and depositing the said earth on a grade or bank or road-bed. The invention consists in the arrangement of a carrier, the said carrier being hinged to a rotary wheel or disk, and provided with tripping and resetting apparatus for causing it to be dumped and reset automatically, all as hereinafter described.

Figure 1 is a plan view of my improved apparatus with one of the side bars cut away to show the arrangement of the rod for tripping the carrier. Fig. 2 is a longitudinal section taken on the line $x\ x$ of Fig. 1, and Fig. 3 is a transverse section taken on the line $y\ y$ of Fig. 2.

A represents a truck-frame mounted at the front end, near one side, on the two-wheeled truck B, and at the rear corner, behind the said truck, on the wheel C, by means of the vertical spindles or shafts D, working loosely up and down in the frame, and jointed at the upper ends to levers E, which are pivoted to stands F, and arranged to be engaged near the free ends with the truck-frame by links or chains, by which they may be adjusted higher or lower to vary the height of the frame at this side from the ground; or, in case the ground is rough, the levers which come near each other at the free ends may be held by the attendant, and the height of the said frame adjusted as required by the variations of the ground. At the opposite side the said frame is supported on the wheel G, the axle of which is rigidly connected to the frame. H is a common metal turning-plow suspended from the vertically-adjustable side of the frame by a bar, I, or other suitable means, and arranged to turn the furrow toward the other side of the machine. K represents an earth-carrier, in the form of a short segment of a ring of considerable breadth radially, having flanges on one side at each edge, which is hinged to the periphery of the large wheel L mounted between the plow and the opposite side of the frame, so as to make an oblique angle with the earth, and running so near the plow that the said carriers, of which there may be any suitable number, receive the earth in passing the plow and carry it around to the high side of the wheel and dump it. The dumping is accomplished by the tripping of the catch-lever M, which engages with the stud N rising up from the carrier, by the end N' being forced down in passing under the bent rod O suspended from the bar P in the path of the said end N. The carriers are reset again by the bent rod Q, against which the studs N come after being tripped, and are forced up under the catch-levers M. The position of the carrier K, when the catch has just been tripped by the rod O, is shown in dotted lines, and its position, when being reset, by the bent rod Q in full lines in Fig. 1. The wheel L rests at the high side on the wheel G, and is turned by it. Instead, however, of employing this wheel G to give motion to wheel L the lower edge of the latter may be caused to bear upon the ground and be turned by the friction thereof, or both these means may be employed together.

Having thus described my invention, I claim as new and desire to secure by Letters Patent—

The hinged dumping-carrier K mounted on the wheel L, the stud N, catch-lever M, trip-rod O, and resetting-rod Q, combined and arranged for tripping and resetting the carriers, substantially as specified.

JOSEPH W. FAWKES.

Witnesses:
 H. B. SMITH,
 J. H. AXTON.